United States Patent
Riddle et al.

(10) Patent No.: US 6,389,067 B1
(45) Date of Patent: May 14, 2002

(54) METHOD AND APPARATUS FOR USING FRAME ENERGY METRICS TO IMPROVE RATE DETERMINATION

(75) Inventors: Christopher C. Riddle; Jeffrey A. Levin, both of San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/329,777

(22) Filed: Jun. 10, 1999

(51) Int. Cl.$^7$ ................................................ H04B 17/00
(52) U.S. Cl. ...................................... 375/225; 375/150
(58) Field of Search ................................ 375/140, 150, 375/225, 265, 341, 316; 370/342, 252, 441, 468, 335, 391

(56) References Cited

U.S. PATENT DOCUMENTS 5,671,255 A * 9/1997 Wang et al. ................. 375/341
5,872,775 A * 2/1999 Saints et al. ................. 370/342

FOREIGN PATENT DOCUMENTS

GB          2301999 A * 12/1996 ........... H04L/25/02
WO          WO-9705717 A1 * 2/1997 ........... H04B/17/00

* cited by examiner

Primary Examiner—Stephen Chin
Assistant Examiner—Chieh M. Fan
(74) Attorney, Agent, or Firm—Philip Wadsworth; Charles Brown; Howard Seo

(57) ABSTRACT

A Wireless Code Division Multiple Access method and apparatus for determining the transmitted rate of a voice/data signal from a mobile station to a Base Station. Variable rate vocoders transmit voice at one of several predetermined frame rates. The receiver determines the transmitted rate based on one of several frame parameters. One of the parameters is received frame energy. The received frame energy is measured over the length of the relevant portion of the frame. Energy is measured over the half of the frame that can only contain energy if a full rate frame is sent. If the energy measured exceeds a threshold, then full rate is indicated. Else, energy is measured over the fourth of a frame that can only contain energy if a half rate frame is sent. If the energy exceeds a threshold, then half rate is indicated. The procedure is repeated for quarter and eighth rates.

16 Claims, 4 Drawing Sheets

METHOD AND APPARATUS FOR USING FRAME ENERGY METRICS TO IMPROVE RATE DETERMINATION

BACKGROUND OF THE INVENTION

I. Field of the Invention

The present invention pertains generally to the field of wireless communications, and more specifically to determining transmitted or received data rates.

II. Background

The field of wireless communications has many applications including, e.g., cordless telephones, paging, wireless local loops, and satellite communication systems. A particularly important application is cellular telephone systems for mobile subscribers. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and TIA-EIA-95. In particular, TIA-EIA-95 and its derivatives, IS-95A,IS-95B, ANSI J-STD-008, and future derivatives and enhancements, etc. (often referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459, which is assigned to the assignee of the present invention and fully incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MUTICHANNEL DEMODULATOR, which is assigned to the assignee of the present invention and fully incorporated herein by reference.

In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum. It is to be understood that while 1.25 MHz is a preferred CDMA channel bandwidth, the CDMA channel bandwidth need not be restricted to 1.25 MHz, and could instead be any number, such as, e.g., 5 MHz.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. (In contrast, hard handoff involves terminating the interface with a first base station before establishing the interface with a second base station.) An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with mobile units (i.e., cellular telephones) via RF signals sent over the air.

In conventional systems, base stations, or cell sites, are configured to communicate via an over-the-air interface with various mobile units. In CDMA cellular systems, the base stations (sometimes referred to herein as base station transceiver subsystems (BTSs)) are often segmented into sectors, as defined by directional antennas, to increase the capacity of the cell. The sectors themselves may be referred to as cell sites. Conventional base station architectures typically employ three such sectors, with the radial directions each sector antenna points differing by 120 degrees. Each sector in a CDMA system functions, for network purposes, as an independent base station.

Previous CDMA based systems have used variable rate vocoders in a transmitting unit. The units are capable of transmitting at one of several predetermined frame rates. The intended receiver in these systems must determine which of the possible frame rates has been transmitted. The rate decision is determined by the blind rate determination algorithm (RDA) implemented within the receiver, which classifies each frame based on several frame parameters. The output of the rate determination operation is an indication of the likely sent frame rate along with an indication of whether or not an error is present within the received frame.

Previous rate determination methodologies have included using Cyclic Redundancy Check (CRC) bits; re-encoded symbol error counts; and Yamamoto quality bits, either alone or in combination.

Typically, all frame rates are decoded before making the decision as to which rate was actually transmitted. This brute force methodology utilized scarce resources in a non-optimal manner. Previous methodologies also encountered performance problems.

What is needed is an apparatus and method for optimally determining the frame rate at the receiving end of a transmitted signal and to improve the performance of the rate decision methodology.

SUMMARY OF THE INVENTION

The present invention is directed to a system and method for determining a received data rate in a radiotelephone system. The apparatus includes a correlator for accumulating a received signal representative of received energy levels to form an accumulated signal. Additionally included is a comparator for comparing an accumulated signal to a predetermined reference level and generating a second signal indicative of a particular data rate, wherein the data rate is either full, half, quarter or eighth rate and is indicative of the received energy level.

An embodiment of the invention includes a method for determining a data rate in a radiotelephone system with the steps of receiving a signal, receiving a signal transmitted from a mobile station at a predetermined data rate, combining the received signal in a RAKE receiver into a summed signal, and then comparing the summed signal with a predetermined threshold to form a comparison result. The most likely data rate is then based on the comparison result.

DETAILED DESCRIPTION OF THE PREFERRED EMBODIMENTS

Various cellular systems for wireless telephone communication employ fixed base stations that communicate with mobile units via an over-the-air interface. Such cellular systems include, e.g., AMPS (analog), IS-54 (North American TDMA), GSM (Global System for Mobile communications TDMA), and IS-95 (CDMA). In a preferred embodiment, the cellular system is a CDMA system. The term cellular encompasses any wireless system that may include cellular, Personal Communication Services (PCS), Wireless Local Loop (WLL) and the like.

Figure 1:
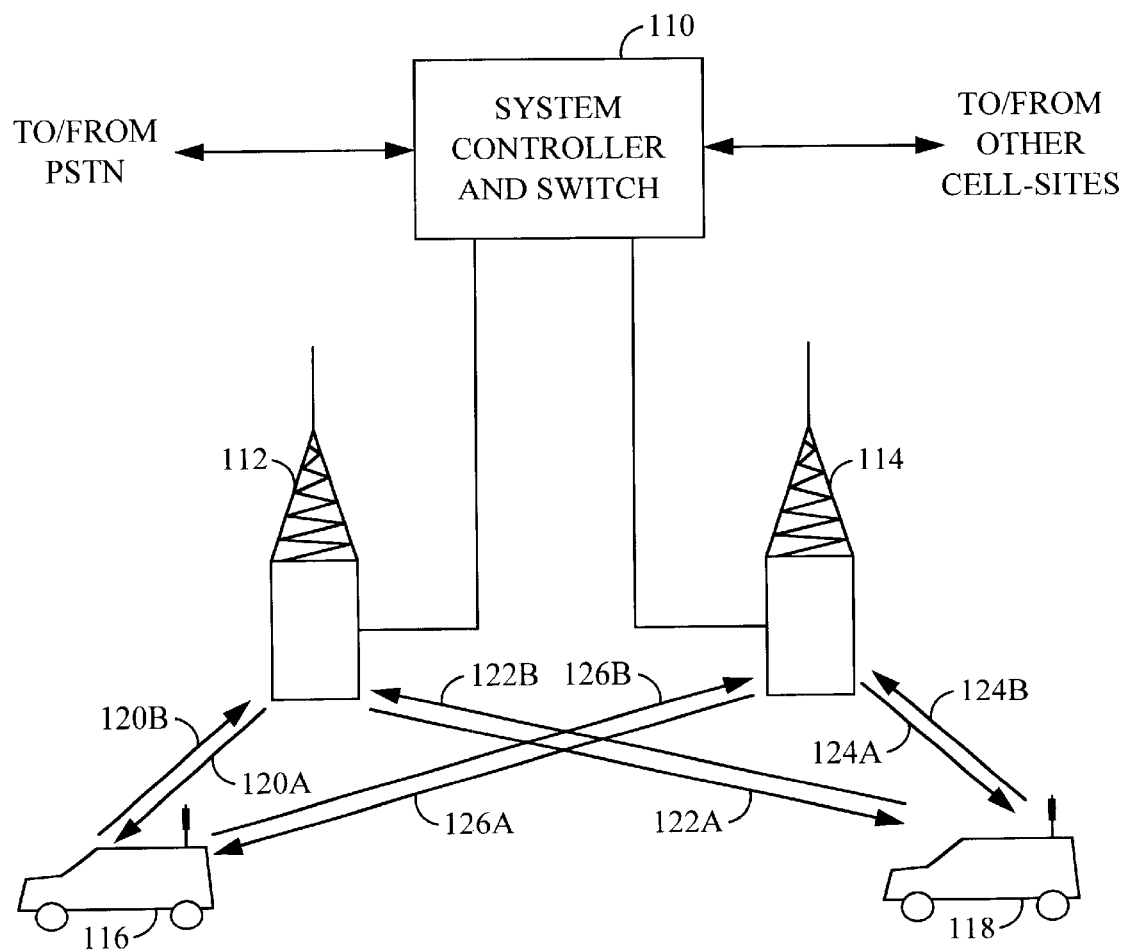
FIG. 1 illustrates a radiotelephone communication system in which an embodiment of the present invention resides and operates.

Referring to FIG. 1, system controller and switch 110, also referred to as a mobile telephone switching office (MTSO), typically includes interface and processing circuitry for providing system control to the cell-sites. Controller 110 also controls the routing of telephone calls from a public switched telephone network (PSTN) to an appropriate cell-site for transmission to an appropriate mobile or subscriber unit Controller 110 also controls the routing of calls from the mobile or remote subscriber units, using at least one cell-site, to the PSTN. Controller 110 may connect or link calls between subscriber users using the appropriate base stations since the subscriber units do not typically communicate directly with one another.

Controller 110 may be coupled to the cell-sites by various means such as dedicated telephone lines, optical fiber links, or microwave communication links. In FIG. 1, two such exemplary cell-sites 112 and 114 are shown along with mobile units 116 and 118, where each mobile unit includes a cellular telephone. Exemplary cell-sites 112 and 114, as discussed herein and as illustrated in the drawings, are considered as providing service to an entire cell. However, it should be understood that a cell may be geographically divided into sectors with each sector providing service to a different coverage area. Accordingly, handoffs generally are made between sectors within a cell, while diversity may also be achieved between sectors as is done between cells.

In FIG. 1, lines 120a–12b and 122a–122b, along with their respective arrowheads, correspond to signal transmission, which includes data transmission over various traffic channels, between cell-site 112 and mobile units 116 and 118, respectively. Similarly, lines 124a–124b and 126a–126b represent communication between cell-site 114 and mobile units 118 and 116, respectively. Cell-sites 112 and 114 nominally transmit using equal power.

The coverage of cell-site service areas or cells is designed or laid out in geographic shapes such that the mobile units will normally be closest to one cell-site, and within only one sector if cell is divided into sectors. When the mobile unit is idle, i.e. no calls in progress, the mobile unit constantly monitors pilot signal transmissions from each nearby cell-site, and, if applicable, from a single cell-site if the cell is sectorized. Mobile unit 116 can determine which cell it is in by comparing signal strength for pilot signals transmitted from cell-sites 112 and 114.

In the example illustrated in FIG. 1, mobile unit 116 may be considered closest to cell-site 112. When mobile unit 116 initiates a call, a control message is transmitted to the nearest cell-site, here cell-site 112. Cell-site 112, upon receiving the call request message, transfers the called number to system controller 110. System controller 110 then connects the call through the PSTN to the intended recipient.

Should a call be initiated within the PSTN, controller 110 transmits the call information to all of the cell-sites in the area. The cell-sites in return transmit a paging message within each respective coverage area that is intended for the called recipient mobile user. When the intended recipient mobile unit "hears" or receives the page message, it responds with a control message that is transmitted to the nearest cell-site. This control message signals the system controller that this particular cell-site is in communication with the paged mobile unit. Controller 110 then routes the call through this cell-site to the mobile unit. Should mobile unit 116 move out of the coverage area of the initial cell-site, 112, an attempt is made to continue the call by routing the call through another cell-site.

In the exemplary system of FIG. 1, orthogonal Walsh functions are assigned to user channels on the cell-to-subscriber link. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform. Another embodiment of the present invention includes assigning orthogonal Walsh functions on the subscriber-to-cell link.

The resulting composite waveform is then modulated onto a sinusoidal carrier, bandpass filtered, translated to the desired operating frequency, amplified and radiated by the antenna system. Alternate embodiments of the present invention may interchange the order of some of the operations just described for forming the cell-site transmitted signal. For example, it may be preferred to multiply each voice channel by the outer PN coded waveform and perform the filter operation prior to summation of all the channel signals which are to be radiated by the antenna. It is well known in the art that the order of linear operations may be interchanged to obtain various implementation advantages and different designs.

The waveform design of the preferred embodiment for cellular service uses the pilot carrier approach for the cell-to-subscriber link, as is described in U.S. Pat. No. 4,901,307. All cells transmit a pilot carrier using the same 32,768 length sequence, but with different timing offsets to prevent mutual interference.

As is described in greater detail below, the symbol stream for a particular cellular user is combined in a first exclusive OR operation with the Walsh sequence assigned to that user. The Walsh function is typically clocked at a rate of 1.2288 MHz, 3.6864 MHz or 4.096 MHz while in an exemplary variable data rate system including voice, facsimile (FAX), and high/low-speed data channels the information symbol rate may vary from approximately 75 Hz to 76,800 Hz. The resulting coded waveform is combined in a second exclusive OR operation with a binary PN sequence also clocked at 1.2288 MHz. Another embodiment of the present invention includes a clock sequence in the range of 3–5 MHz or above. Specifically, a preferred embodiment includes the rates of 3.6864 MHz and 4.096 MHz. An identical binary PN sequence is used to encode each subscriber channel within a particular sector of the coverage area of the cellular system. As a consequence of the orthogonality of the Walsh coding sequences, each sequence may be used to process user data on a single RF channel associated with such a sector without inducing interference among the users within the sector.

Prior to application of Walsh coding, the signals carried by each channel may also be convolutional encoded, with repetition, and interleaved in order to provide error detection and correction functions which allow the system to operate at a much lower signal-to-noise and interference ratio. Techniques for convolutional encoding, repetition, and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Optionally, the preferred embodiment may be, but need not be, backwards compatible with the IS-95 series of related standards.

Figure 2:
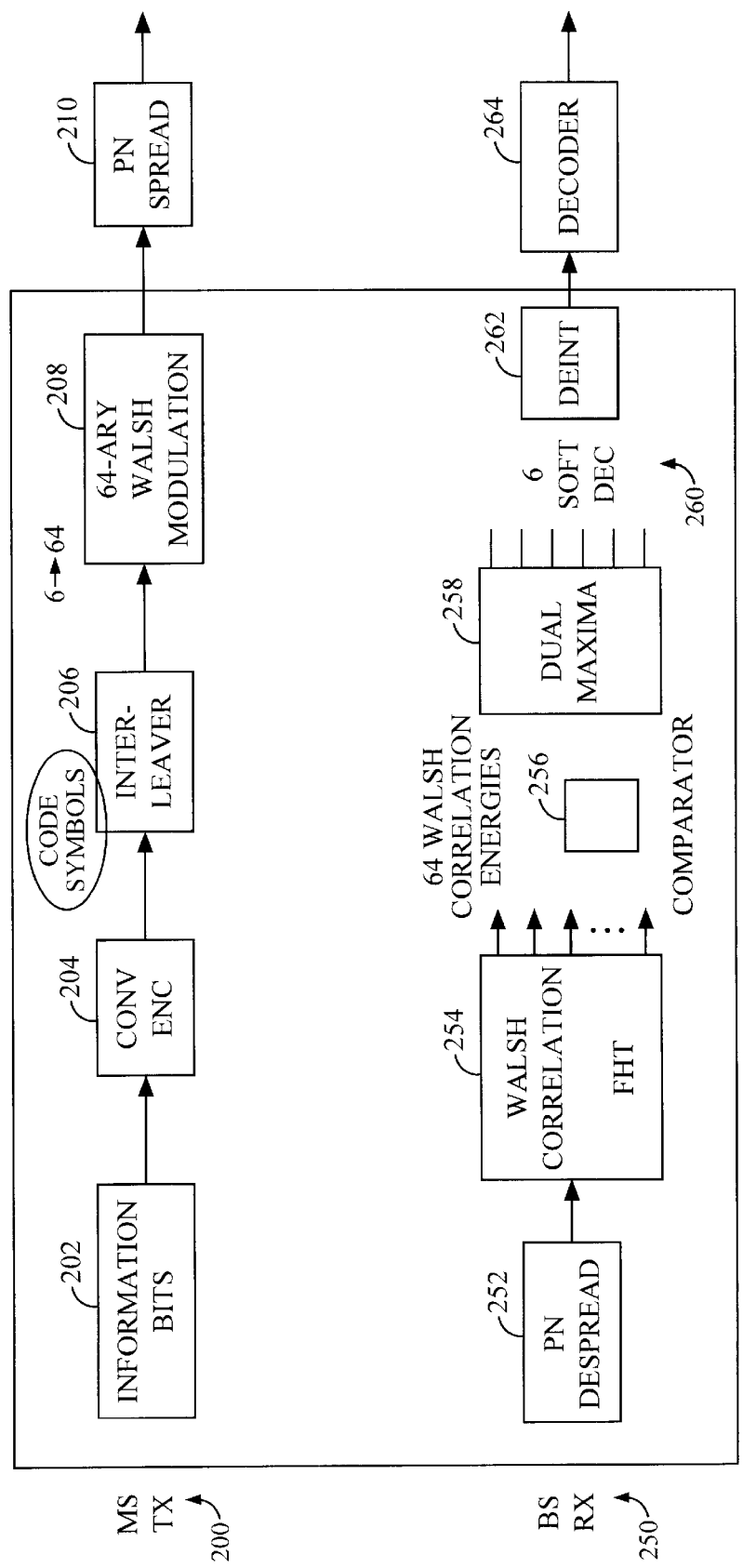
FIG. 2 illustrates mobile station transmitter and base station receiver reverse link block diagrams of an embodiment of the present invention.

Turning now to FIG. 2, reverse link mobile station transmitter and base station receiver sections are illustrated. Mobile station transmission 200 begins with the generation of information bits 202. These information bits 202 may represent output from a vocoder (not shown) where speech has been translated into digital format or, alternatively, may have originated as digital data in the first place. For the purposes of the invention, the source of the information bits 202 is irrelevant. Information bits 202 are sent to convolutional encoder 204 where redundancy for forward error correction is added. Resultant code symbols are then interleaved in interleaver 206 on a time diversity basis and sent to modulator 208. Modulator 208 expands the interleaved symbols into an orthogonal 64-ary Walsh Code sequence per the IS-95 (or related) standard. The resulting Walsh symbols are then spread at the appropriate rate.

In base station receiver 250, the signal transmitted from mobile station transmitter 200 is received at despreader 252. The received signal is despread and sent to Walsh correlator 254 where a Hadamard Transform (HT) is performed on the received signal. The received signal is placed in one of 64 Walsh correlation energy bins where the correlation energies are calculated and compared with a predetermined level in comparator 256 according to an embodiment of the present invention which will be explained in greater detail below in reference to FIG. 3. The received symbol is used to generate 6 soft decisions in items 258, 260 The received signal is then deinterleaved in deinterleaver 262 and decoded in decoder 264 according to the IS-95 standard.

The process for evaluating the energy received involves summing the energy of the maximum Walsh correlation energy (Walsh energies) among all the received fingers of the received signal, where each finger represents a different multipath reception of the same transmitted signal in a RAKE or other suitable receiver.

Figure 3:
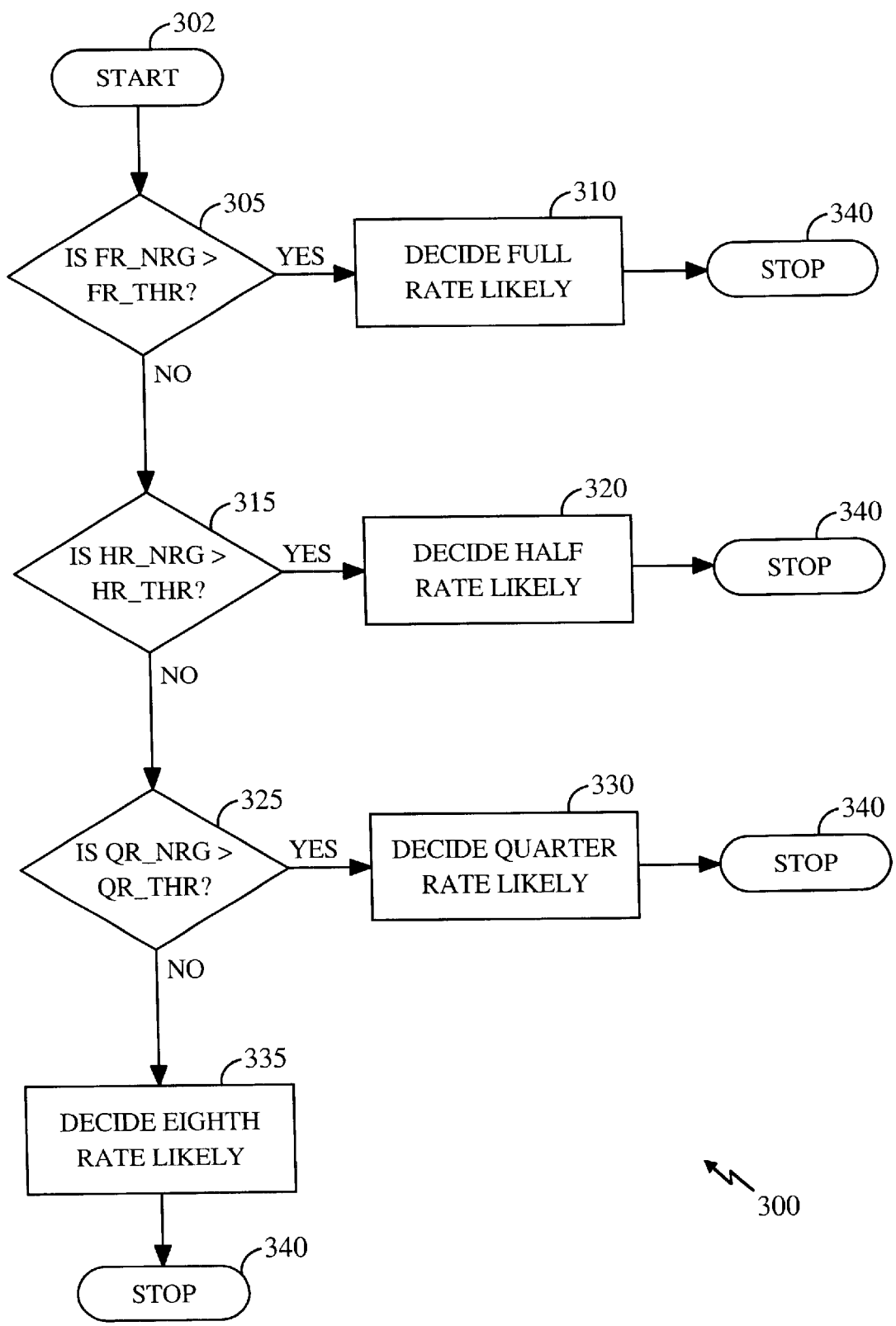
FIG. 3 illustrates a flowchart diagram of an embodiment of the present invention.

With respect to FIG. 3, methodology 300 includes comparison step 305. The Full rate energy (FR_NRG) is compared to predetermined threshold FR_THR. The preferred embodiment for calculating the frame energy is to sum the maximum Hadamard Transform (HT) correlation energies over an entire frame (or target portion thereof depending on the current rate hypotheses). The threshold is variable based on the performance requirements of the rate decision algorithm which is may depend on the application (voice, data, etc.). If FR_NRG exceeds the FR_THR threshold, then Full Rate is indicated in step 310. In step 315, if Full rate is not present, then a test for half rate is conducted. If the received level over the Half of the frame HR_NRG containing half rate energy exceeds the HR_THR threshold, then half rate is indicated in step 320. If neither half or full rates have been indicated, then control passes to step 325. If the measured energy QR_NRG across a quarter of the frame exceeds a QR_THR threshold, then a quarter rate is determined in step 330. In step 335, if a rate has yet to be determined, then an eighth rate is presumed.

Thus, in summary, FR_NRG is the sum of the maximum Walsh correlation energy over the full rate worth Power Control Groups (PCGs) which are not worthy for any of the lower rates Half, quarter and eighth). Likewise, HR_NRG is the sum of the maximum Walsh correlation energy over the half rate worthy PCGs which are also not worthy for any of the lower rates (quarter and eighth). Similar methodology is repeated for the QR_NRG and ER_NRG terms, as necessary.

Figure 4:
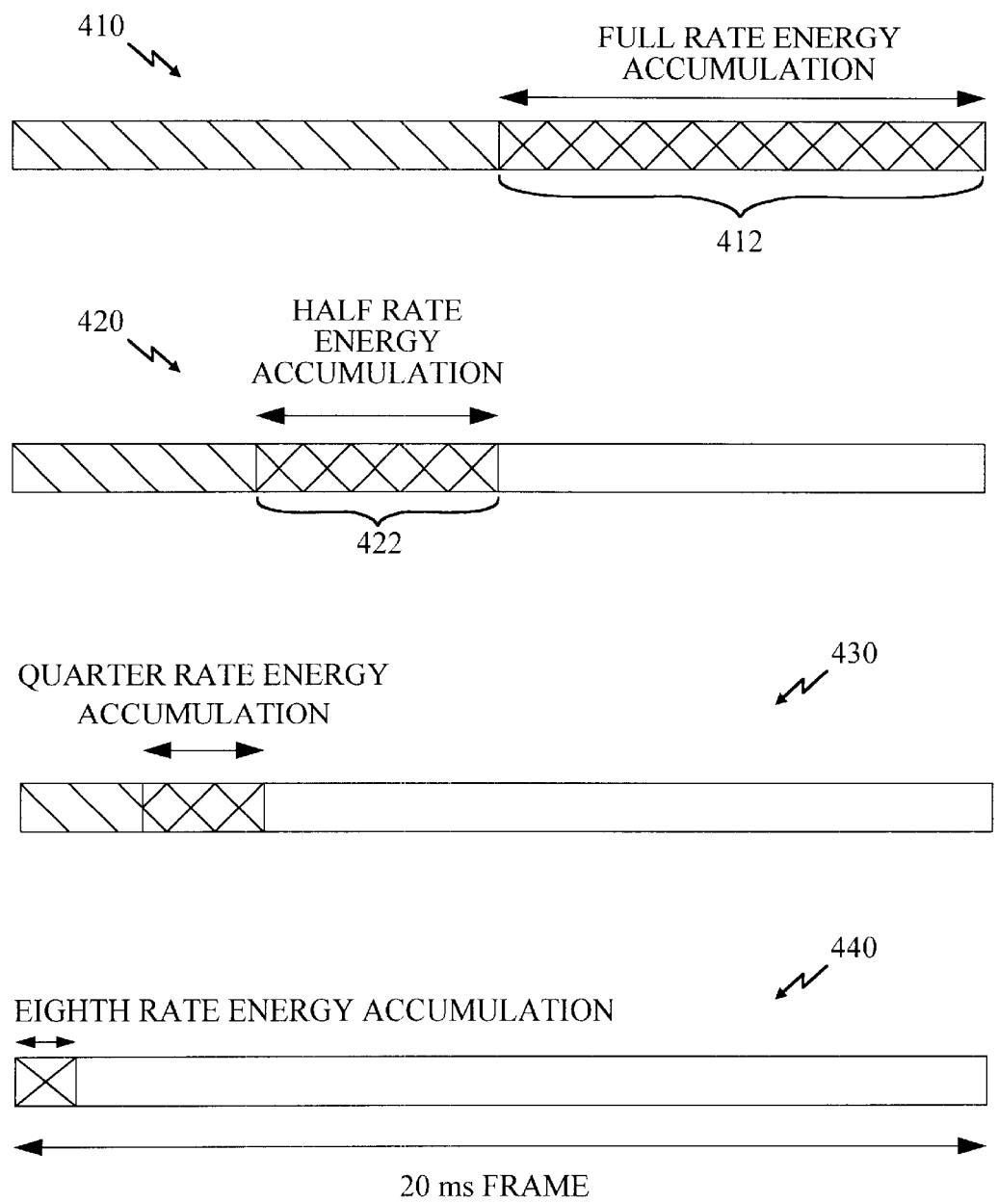
FIG. 4 illustrates a representation of the frame energy at various frame rates in an embodiment of the present invention.

Referring now to FIG. 4, a pictorial representation of energy accumulation during a frame is depicted. For ease of presentation, continuous bands of energy are shown so that differentiation between the rates may be easily shown. Up to 16 discrete bands of energy known as Power Control Groups (PCGs) are spaced pseudorandomly throughout a frame according to the IS-95 standard. Full rate energy occupies the entire frame as depicted in bar 410. Bar 420 depicts the half rate energy accumulation as occupying only half the frame, while quarter rate bar 430 and eighth rate bar 440 are likewise depicted.

A preferred embodiment of the invention utilizes the feature of using the portion of the frame containing energy only for that rate and for higher rates. For example, referring to bar 410, the right hand half of the bar 412 is examined for energy. If energy exceeding the predetermined level is found, then it may be readily seen from FIG. 4 that a Full rate is likely to have been transmitted. Applying the above methodology to bar 420, assuming that full rate has not been determined, then portion 422 of bar 420 is examined. If energy exceeding a predetermined level is found, then a half rate determination is most likely. Again, referring to bar 430, if portion 432 of bar 430 is sequentially examined after full and half rate measurements have been determined not to be present, then a quarter rate determination is made. Likewise, if neither full, half or quarter rate determinations are made, then an eighth rate determination is made.

The demodulation metric of frame energy provides additional information to traditional decoder metrics and helps improve performance over methodologies that do not include frame energy calculations. For example, frame energy metrics can be used to improve a decoder metric based methodology in an IS-95 CDMA system. A mobile station uses data burst randomization for transmission at the lower rates. Each frame is divided into 16 equal length Power Control Groups (PCGs). The full, half, quarter and eighth rate frames are transmitted using 16, 8, 4, and 2 PCGs per frame, respectively. The PCGs for which the mobile station transmits are called worthy PCGs. The presence and/or absence of energy in the different PCGs is correlated with the transmitted rate.

In a preferred embodiment, the frame energy is taken as the maximum Hadamard Transform (HT) correlation energy over the worthy PCGs that are also not worthy for the lower rates. The first set contains the 8 PCGs used only when a full rate frame is transmitted. The second set contains the 4 PCGs that are used whenever a full rate or a half rate is transmitted. The third set contains the 2 PCGs used whenever a quarter rate or higher rate frame is transmitted. The final set includes the remaining 2 PCGs that are always transmitted for all rates.

Thus, a novel and improved method and apparatus for determining a received data rate has been described. As those of skill in the art would understand, the specific embodiment applies to a CDMA wireless communication system but could also be applied to any digital (either CDMA or TDMA) terrestrial or satellite, fixed or mobile wireless (voice or data or a combination thereof) system with or without a distributed architecture.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims and their equivalents.

What is claimed is:

1. A system for determining a received data rate from a plurality of transmission data rates in a radiotelephone system including:
    a correlator for accumulating a received signal representative of received energy levels to form a plurality of accumulated signals, each of the accumulated signals representing one of the transmission data rates; and
    a comparator for comparing the accumulated signals to predetermined reference levels and generating a second signal indicative of one of the transmission data rates,
    wherein each of the accumulated signals is the sum of a maximum correlation energy accumulated over power control groups which are not worthy for the transmission data rates that are lower than the represented transmission data rate.

2. The system as in claim 1 further including;
    a pseudonoise despreader for despreading the received signal.

3. The system as in claim 2 further including:
    a decoder for decoding the received signal at a data rate based on said second signal.

4. The system of claim 3 wherein said comparator generates said second signal based on a predetermined number of pseudorandomly spaced discrete portions of a frame within the received signal.

5. The system as in claim 4 wherein said transmission data rates are one of full, half, quarter or eighth rate.

6. The system as in claim 5 wherein said radiotelephone system includes a code division multiple access receiver.

7. The radiotelephone system of claim 6 further including a RAKE receiver.

8. A method for determining a received data rate from a plurality of transmission data rates in a radiotelephone system including the steps of:
    (a) receiving a signal;
    (b) accumulating the received signal to form a plurality of accumulated signals, each of the accumulated signals representing one of the transmission data rates;
    (c) comparing each of the accumulated signals with one of predetermined thresholds to form a comparison result; and
    (d) determining the received data rate based on said comparison result,
    wherein each of the accumulated signals is the sum of a maximum correlation energy accumulated over power control groups which are not worthy for the transmission data rates that are lower than the represented transmission data rate.

9. The method of claim 8 wherein step (a) further includes:
    (a1) receiving a signal transmitted from a mobile station.

10. The method of claim 9 wherein step (a) further includes:
    (a2) receiving the signal at a predetermined data rate.

11. The method of claim 8 wherein the predetermined thresholds are dependent on the power control groups that are transmitted during a frame.

12. The method of claim 11 wherein the predetermined thresholds are based on the transmission data rates.

13. The method of claim 8 wherein the transmission data rates include full rate, half rate, quarter rate and eighth rate data rates.

14. A system for determining a received data rate from a plurality of transmission data rates in a radiotelephone system, said system comprising:
    means for receiving a signal;
    means for accumulating the received signal to form a plurality of accumulated signals, each of the accumulated signals representing one of the transmission data rates;
    means for comparing each of the accumulated signals with one of predetermined thresholds to form a comparison result; and
    means for determining the received data rate based on said comparison result,
    wherein each of the accumulated signals is the sum of a maximum correlation energy accumulated over power control groups which are not worthy for the transmission data rates that are lower than the represented transmission data rate.

15. The system of claim 14, further comprising:
    means for receiving a signal transmitted from a mobile station.

16. The system of claim 14 wherein the transmission data rates include full rate, half rate, quarter rate and eighth rate data rates.

* * * * *